United States Patent
Tandy, Jr. et al.

(10) Patent No.: US 7,447,585 B2
(45) Date of Patent: Nov. 4, 2008

(54) STABILITY ENHANCING SYSTEM FOR TOW-VEHICLE TOWING TRAILER-ASSEMBLY WITH TRAILER SENSORS

(75) Inventors: Donald Frank Tandy, Jr., The Woodlands, TX (US); Donald Frank Tandy, Sr., Beavercreek, OH (US)

(73) Assignee: Tandy Engineering & Associates, Inc., The Woodlands, TX (US)

( * ) Notice: Subject to any disclaimer, the term of this patent is extended or adjusted under 35 U.S.C. 154(b) by 79 days.

(21) Appl. No.: 11/416,971

(22) Filed: May 3, 2006

(65) Prior Publication Data

US 2007/0260386 A1 Nov. 8, 2007

(51) Int. Cl.
*G06F 19/00* (2006.01)
*B60K 28/14* (2006.01)

(52) U.S. Cl. ............... 701/70; 280/423.1; 280/763.1; 180/14.2

(58) Field of Classification Search ............ 701/70; 280/423.1, 763.1, 476.1; 180/14.2; *G06F 19/00; B60K 28/14*

See application file for complete search history.

(56) References Cited

U.S. PATENT DOCUMENTS

| | | | | |
|---|---|---|---|---|
| 5,747,683 | A | 5/1998 | Gerum et al. | 73/118.1 |
| 5,990,788 | A | 11/1999 | Syracuse | 340/458 |
| 6,042,196 | A | 3/2000 | Nakamura | 303/7 |
| 6,382,018 | B2* | 5/2002 | Knestel | 73/117.01 |
| 6,498,977 | B2* | 12/2002 | Wetzel et al. | 701/70 |
| 6,516,260 | B2* | 2/2003 | Wetzel et al. | 701/50 |
| 6,516,925 | B1* | 2/2003 | Napier et al. | 188/112 A |
| 6,668,225 | B2 | 12/2003 | Oh | 701/70 |
| 6,957,873 | B2 | 10/2005 | Wanke | 303/140 |
| 6,959,970 | B2* | 11/2005 | Tseng | 303/146 |
| 7,134,733 | B2* | 11/2006 | Eckert et al. | 303/123 |
| 2001/0018630 | A1* | 8/2001 | Wetzel et al. | 701/70 |
| 2001/0037164 | A1* | 11/2001 | Hecker | 701/1 |
| 2002/0060625 | A1* | 5/2002 | Lesesky et al. | 340/431 |
| 2002/0069006 | A1* | 6/2002 | Faye et al. | 701/70 |
| 2002/0107627 | A1* | 8/2002 | Funke et al. | 701/70 |
| 2004/0041358 | A1* | 3/2004 | Hrovat et al. | 280/5.502 |

\* cited by examiner

*Primary Examiner*—Tuan C To
(74) *Attorney, Agent, or Firm*—Buskop Law Group, PC; Wendy Buskop

(57) ABSTRACT

A system for providing enhanced stability, control, and management for a tow-vehicle towing a trailer assembly with trailer sensors is disclosed. The system includes a tow-vehicle with an electronic stability enhancing system in communication with a processor with memory and computer instructions. The system includes sensors located on the tow-vehicle and the trailer for detecting engagement with the trailer when communicating with an integrated circuit system and for detecting force, motion, and combinations thereof, when communicating with the processor. Computer instructions instruct the processor to identify specifications representing the tow-vehicle and trailer assembly and to calculate force values and motion values affecting the tow-vehicle and trailer assembly. Computer instructions can provide instructions for braking to at least one wheel of the tow-vehicle and the trailer using the force values, motion values, the electronic stability enhancing system, and specifications of the tow-vehicle and the trailer assembly.

17 Claims, 3 Drawing Sheets

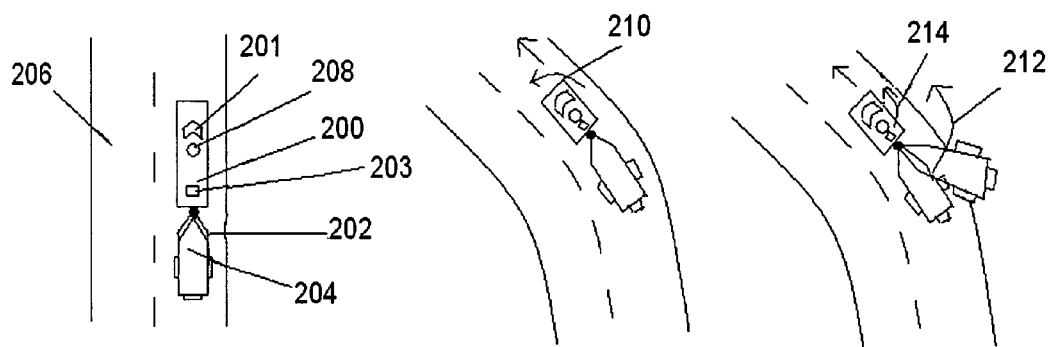
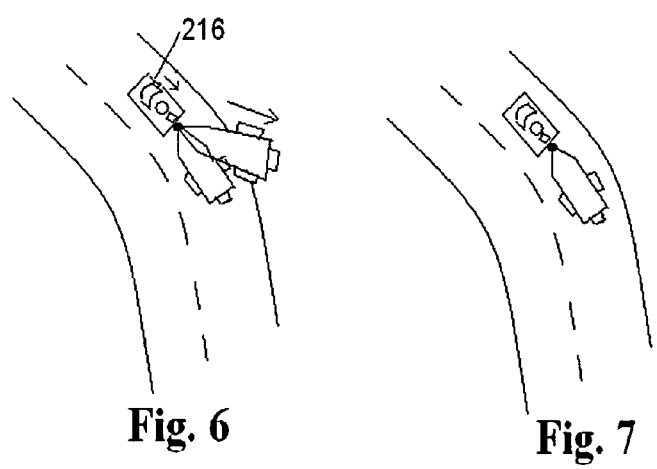

STABILITY ENHANCING SYSTEM FOR TOW-VEHICLE TOWING TRAILER-ASSEMBLY WITH TRAILER SENSORS

FIELD

The present embodiments relate generally to an electronic stability enhancing control system for assisting with stability, control, and management of a tow-vehicle towing a trailer assembly with trailer sensors.

BACKGROUND

Safety systems for vehicles have evolved through the years and have been improved upon by enhancements such as intervention into the suspension, steering, brakes, or engine management of the driving engine for the vehicle. Such enhancements include: traction slip control to prevent the spinning of the wheels of the vehicle, brake force proportioning to regulate the ratio of brake forces between the front axle and rear axle of the vehicle, anti-lock brakes, and electronic stability control which can affect driving conditions of the vehicle during yawing of the vehicle about its vertical axis.

In electronic stability control systems for vehicles, it is necessary to be able to assess the behavior of the vehicle, particularly if the assessment and any response can be accomplished in real time. These systems that assess vehicle motion, accomplish this assessment in real time and rely on the ability to monitor the movements of the vehicle by installing sensors to measure the acceleration of the vehicle and the angular rotational rates of the vehicle.

During normal driving, the vehicle responds to the driver's commands, and the driver maintains control of the vehicle. However, if the driver operates the vehicle beyond his/her limits or even the limits of the vehicle, the vehicle can exhibit a spin response as a yaw movement in excess of that required for the situation, or a plow response as a yaw movement less than that required for the situation. A system such as the Electronic Stability Program (ESP) can provide some correction to the motions of the vehicle in certain situations by using mathematical models that consider the vehicle dynamics and forces of the tires of the vehicle along with measurements supplied by sensors recording vehicle speed, yaw rate, and actions of the driver of the vehicle, such as the steering wheel and the application of the brakes and accelerator.

However, the use of Electronic Stability Program mathematical models can have some limitations with respect to how much a motion can be corrected or whether a driver will respond appropriately. In addition, such systems function by observing movements of the body of the vehicle, only, and do not extend to any auxiliary vehicle, such as a trailer connected to the vehicle. Accordingly, all forces affecting the performance of a combination vehicle and trailer would not be included in the mathematical model of the Electronic Stability Program as the information is gathered from the vehicle, only. Also, many of the existing Electronic Stability Program systems do not include determinations of whether a trailer is attached to the tow-vehicle.

Thus, a need exists for an electronic stability enhancing system that can include direct assessment, response, and multiple actions applied in real time and based upon determinations of driver inputs of the vehicle towing the trailer assembly along with direct measurements of forces and motions and information gathered from the tow-vehicle connected to the trailer assembly.

Further, a need exists for an electronic stability enhancing control system, that uses a model, which includes the tow-vehicle vehicle and the trailer assembly, such that the computer instructions of the electronic stability enhancing system can be used in determining a direct response for optimizing the performance of the tow-vehicle and trailer assembly combination. Such a system can provide for an improved optimization of the electronic stability control system for the vehicle when the vehicle is pulling a trailer.

The present embodiments of the invention meet these needs.

SUMMARY

The embodiments of the invention relate generally to an electronic stability enhancing control system for assisting with force and motion control, management, and stability for a tow-vehicle towing a trailer assembly with the ability to brake trailer assembly.

The embodiments of the system include a tow-vehicle with an electronic stability enhancing control system, including a processor with a memory. A plurality of sensors can be located on the tow-vehicle and the trailer, and the tow-vehicle sensors and the trailer sensors can be adapted to communicate with a trailer electrical system when the trailer is connected to the tow-vehicle. This allows the tow-vehicle sensors and the trailer sensors to be used for detecting engagement with the trailer.

The tow-vehicle sensors and the trailer sensors can communicate with the processor on the tow-vehicle for providing an improved safety system for stability and control of the tow-vehicle with the connected trailer assembly, in some situations. This communication allows the sensors on the tow-vehicle and the trailer to provide input to the processor regarding force values, motions values, and combinations thereof, for operation and handling corrections regarding the tow-vehicle with the connected trailer assembly.

The embodiments of the electronic stability enhancing control system include computer instructions for instructing the processor of an on-board computer of the tow-vehicle to identify specifications representing the tow-vehicle, specifications representing the trailer, and for calculating at least one force, at least one motion, and combinations thereof, affecting the stability and control of the tow-vehicle with the connected trailer assembly. Examples of such forces and motions can include: lateral forces, vertical forces, lateral motions, pitch rates, yaw rates, yaw angles, roll rates, steering input, steering rates, vehicle speed, braking forces, and combinations thereof.

Computer instructions are located in the memory of the processor and can provide instructions for control, management, and stabilization of the tow-vehicle with the connected trailer assembly, which can include braking to at least one wheel of the tow-vehicle by using one or more forces and/or one or more motions, the electronic stability enhancing system, and the specifications of the tow-vehicle with the connected trailer assembly.

BRIEF DESCRIPTION OF THE DRAWINGS

The detailed description will be better understood in conjunction with the accompanying drawings as follows:

FIG. 3 is a first in a sequential series of representations depicting an embodiment of the invention.

FIG. 4 is a second in the sequential series started with FIG. 3.

FIG. 5 is a third in the sequential series started with FIG. 3.

FIG. 6 is a fourth in the sequential series started with FIG. 3.

FIG. 7 is the last in the sequential series started with FIG. 3.

Figure 1:
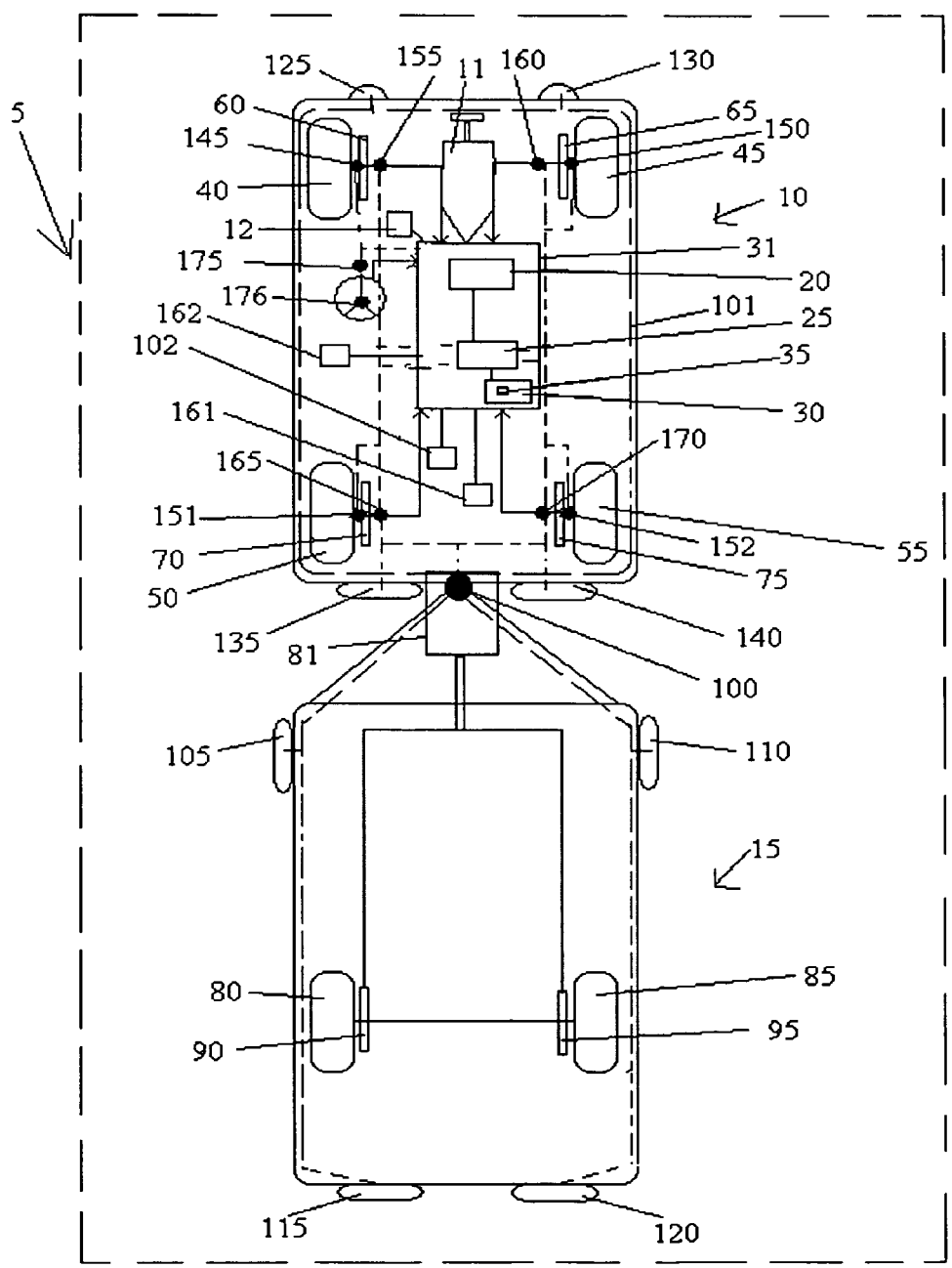
FIG. 1 depicts a top view of an embodiment of the stability enhancing system for a tow-vehicle with a connected trailer assembly comprising at least two wheels.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate generally to an electronic stability enhancing control system for assisting with stability, control and management of a tow-vehicle towing a trailer assembly for assisting with force and motion stability, control and management of a tow-vehicle towing a trailer assembly.

The embodiments of the invention provide the benefit of an improved electronic stability enhancing control system for handling, steering, and stability of a vehicle towing a trailer assembly. The embodiments provide a system which may reduce crash risks and cargo spillage on roadways, including spillage of hazardous cargo on roadways pulled in tandem trailers by trucks, in some situations. The embodiments of the invention may provide a reduction in trailer swaying and jackknifing to prevent wrecks in some situations.

The embodiments of the invention include a stability enhancing system for a tow-vehicle with a connected trailer assembly that can include an electronic stability enhancing system with a computer having a processor and a memory located on the tow-vehicle and in communication with the sensors located on the trailer assembly for detecting force, motion, and engagement with the trailer.

Examples of the tow-vehicle can include: a passenger car, a tractor, a sport utility vehicle (SUV), a van, a recreational vehicle, a bus, a pick-up truck or other truck with a gross vehicle weight rating (GVWR) of less than or equal to 20,000 pounds, a medium or heavy truck with a gross vehicle weight rating (GVWR) range of over 20,000 pounds, a semi-truck, or other motorized vehicle. Semi-trucks can be connected to or can tow semi-trailers or tandem trailers. Examples of manufacturers of semi-trucks include: Volvo, Peterbilt, Kenworth, and other semi-truck manufacturers.

The tow-vehicle includes a brake adjacent to each wheel of the tow-vehicle, such as an electric brake manufactured by Visteon Corporation of Van Buren Township, Mich., a surge brake manufactured by U-Haul Corporation of Phoenix, Ariz., a hydraulic brake manufactured by Bosch Corporation of Chicago, Ill., a pneumatic brake manufactured by Bendix Corporation of Frankfort, Ky., and combinations of these brakes between the trailer and the tow-vehicle.

The embodiments include the tow-vehicle towing a trailer, in which the trailer can be: an equipment trailer such as a Millennium heavy equipment trailer, a utility trailer such as a Millennium utility trailer, a tandem trailer such as a Titan tandem axle cargo trailer, an enclosed trailer such as a Titan enclosed gooseneck trailer, a work trailer such as a Millennium dump trailer for hauling dirt, a horse trailer such as an Exiss horse trailer, a car hauler trailer such as a Featherlite and Pace car hauler trailer or a Featherlite race car trailer, a motorcycle trailer such as a Haulmark motorcycle trailer, a Coleman pop-up trailer, a recreational trailer such as an Airstream recreational trailer, a house trailer made by such manufacturers as American Homestar Homes, a boat trailer such as a Donzi or a Shorelander boat trailer, a semi-trailer such as a Fruehauf Transport Trailer or a Fruehauf Tanker Trailer, or other trailers having at least two wheels.

The trailer can include between one and fifteen axles with each wheel attached to an axle and having a brake adjacent to at least one wheel on each side. In an embodiment, the trailer has at least one brake that can be of a different type of brake than the brake type on the tow-vehicle.

The tow-vehicle and trailer have sensors for communicating with a tow-vehicle processor to detect and identify the existence of a trailer. The tow-vehicle computer can identify the trailer by plugging the lighting system of the trailer into the lighting the system of the tow-vehicle, which is connected to the processor. The lighting system of the trailer includes a wiring harness with a plug that, when connected to the wiring harness of the tow-vehicle, provides a resistance that can be detected when the connection is completed. Other integrated circuit systems and combinations of different types of integrated circuit systems, such as electrical and battery, can be used for identifying the trailer, as well.

Sensors are located on the trailer for detecting a force, a motion and combinations thereof, and communicate with the processor on the tow-vehicle. The sensors on the tow-vehicle also communicate with the processor on the tow-vehicle to provide information to the processor about the tow-vehicle with the connected trailer assembly. For example, the sensors can be a proximity braking sensor manufactured by Bently Nevada of Houston, Tex., for providing information on the motion of a brake shoe in braking applications, a position sensor manufactured by Systron Donner of Concord, Calif., for sensing a position of the brake shoe relative to the sensor as an indication of the application of the braking system, and a position sensor manufactured by Bently Nevada of Houston, Tex., for sensing a wheel placement in relation to the control arm regarding suspension characteristics of the tow-vehicle and trailer assembly.

Sensors on the trailer or the tow-vehicle can be force sensors manufactured by Sensor Developments, Incorporated of Orion, Mich., and Futek of Irvine, Calif., that can be used to provide information to regulate lateral forces, vertical forces, circumferential forces, and coupling forces on the tow-vehicle and trailer assembly including: a lateral force, a braking force on the assembly, or a side wind gust force.

Force sensors on the tow-vehicle and on the trailer can provide input for maintaining centers of gravity to prevent rollover with respect to the tow-vehicle and trailer assembly combination. Motion sensors can be used to provide information with regard to translational motions and angular motions of the tow-vehicle and trailer assembly combination. For example, translational motions can include lateral acceleration and deceleration motions, and angular motions can include yaw angle, yaw rate, pitch angle, pitch rate, and roll rate. The input from the sensors and the resulting computer instructions can provide optimization regarding specifications and characteristics of the tow-vehicle with the connected trailer assembly to possibly reduce dangerous motions of the assembly, such as sway, pitch, roll, yaw, and combinations thereof, in order to provide a much improved stability enhancing control system.

Motion sensors, can include displacement sensors, velocity sensors, or acceleration/deceleration sensors.

Displacement sensors, such as a string potentiometer, made by Space Age Corporation can be included to provide information on the angle between the trailer and the tow-vehicle.

Systron Donner of Concord, Calif., provides velocity sensors that are, for example, roll rate transducers and yaw rate transducers for monitoring the yaw, roll, and pitch velocities. These sensors can be used to provide information on motion relative to braking or wheel movement.

Acceleration sensors such as lateral or longitudinal accelerometers made by Systron Donner provide acceleration information on the tow-vehicle regarding lateral acceleration or longitudinal acceleration.

Wheel speed sensors are another type of sensors that are usable herein. Examples of wheel speed sensors include those manufactured by Systron Donner of Concord, Calif., and Bently Nevada of Houston, Tex., that can be used for providing information on tow-vehicle and trailer assembly speed and acceleration/deceleration.

Another example of a sensor that can be included in an embodiment can be a yaw sensor. Yaw sensors can be used for providing information regarding rotary movements of the tow-vehicle and/or trailer assembly and for altering the spin or plow motions of either the tow-vehicle or trailer assembly.

Other examples of sensors usable herein are torque sensors and steering wheel angle sensors. Torque sensors can be manufactured by Systron Donner of Concord, Calif., and Futek of Irvine, Calif., for providing information on braking or wheel traction. Steering wheel angle sensors can be manufactured by Systron Donner of Concord, Calif., and can provide information concerning the steering torque in a given maneuver of the tow-vehicle and trailer assembly.

The embodiments of the system provide a control and stability strategy by using the sensors to provide information input to the computer with the processor on the tow-vehicle, which in turn has computer instructions for assisting the driver in situations where forces and motions exceed preset limits. An uncontrollable motion of the tow-vehicle and trailer assembly can be the uncontrolled, large-angular motion of the trailer in relation to the tow-vehicle that results in an oscillating yaw motion which can build into a phenomenon called jackknifing. In this situation, the motion of the tow-vehicle and the trailer exceed a certain threshold value, or preset limit. Then, with a certain speed, motion and force, the result can be a loss of control and stability of the tow-vehicle and trailer assembly.

A driver's handling of the tow-vehicle and trailer assembly prior to exceeding the angle threshold value or preset limit is important as the driver may not apply the proper inputs of steering or braking, at all times, which are the required motions and forces of the assembly needed for safe driving, such as correct tire forces. Accordingly, force sensors, angular motion sensors, translational motion sensors, steering wheel angle sensors, and other sensors can provide information on steering angles, motions, speed, and braking to the processor for guidance to the processor and possible assistance with the driver's handling of the tow-vehicle and trailer assembly, which can reduce this type of phenomenon in some situations.

Computer instructions stored in memory of the processor can be used to adjust the engine power to alter at least one motion, at least one force, or combinations thereof, of the tow-vehicle with the connected trailer assembly.

An embodiment of the system includes computer instructions adapted for instructing the processor located on the tow-vehicle to identify specifications and characteristics representing the tow-vehicle and to detect the presence of the trailer to assist with stability and control of the assembly. Further, the system can include computer instructions adapted for instructing the processor located on the tow-vehicle to identify specifications and characteristics representing the trailer to assist with stability and control of the assembly combination. These instructions affect sway, pitch, roll, and yaw of the tow-vehicle and the trailer assembly when at least one characteristic exceeds a preset limit.

Specifications on the tow-vehicle can include such characteristics as: tow-vehicle length, tow-vehicle height, tow-vehicle width, tow-vehicle weight, tow-vehicle inertia value, tow-vehicle wheel configurations, tow-vehicle tire characteristics, tow-vehicle suspension characteristics, and combinations thereof.

Specifications on the trailer include such trailer characteristics as: trailer length, trailer width, trailer height, trailer weight, trailer wheel configurations, trailer wheel sizes, trailer wheel diameters, trailer tire characteristics, trailer suspension characteristics, trailer dimensional characteristics, trailer inertia values, and combinations thereof.

Trailer dimensional characteristics can include information on where the wheels are located relative to the point of connection of the trailer to the tow-vehicle. Trailer tire characteristics can include force and moment characteristics which describe how a tire works and how forces are generated on the tires by such motions relating to the cornering of the tires, angles of the tires in relation to the ground, air content and stiffness of the tire, and other such parameters. Trailer suspension characteristics include the placement of the wheels and how a wheel moves with the forces exerted on the wheel, which can involve other characteristics such as shock absorber characteristics and other suspension part characteristics. Trailer wheel configuration refers to the number of tires and where each tire is located in relation to the other tires, for example a semi-truck can have a dual tire configuration, whereas a car would have a single tire configuration.

The preset limit referred to in the invention is the limit that has been preinstalled in the memory of the electronic stability enhancing system, wherein the preinstalled limit is based on specifications of the tow-vehicle, the trailer, or the tow-vehicle and trailer assembly, and the preset limits should not be exceeded during towing or the system will engage.

An embodiment of the system includes computer instructions adapted for calculating at least one force, at least one motion, and combinations thereof, which affect the tow-vehicle with the connected trailer assembly. The control of the at least one force and the at least one motion is important to stability and management of the tow-vehicle and trailer assembly and can include: a lateral force, a translational motion, an angular motion, a coupling force, a steering input, a steering torque, a steering rate, a vehicle speed, a wheel speed, a braking force, a braking pressure, a throttle position, a brake pedal position, and combinations thereof. Throttle position refers to the position to which an accelerator pedal is depressed by the driver. Brake pedal position refers to the position to which a brake pedal is depressed by the driver and can be sensed by a braking pressure sensor. In an embodiment, an on-board braking system can be included for the tow-vehicle as part of a pre-installed anti-lock braking system (ABS) for the tow-vehicle and connected to the brakes.

Further, an embodiment can include computer instructions for applying braking to at least one wheel of the tow-vehicle and/or the trailer by: (1) using at least one force, at least one motion, and combinations thereof, and (2) using the electronic stability enhancing system using the specifications of the tow-vehicle and the connected trailer assembly. The computer instructions use and optimize the specifications and characteristics of the tow-vehicle with the connected trailer assembly to reduce motions such as sway, pitch, roll, yaw, and combinations thereof, of the tow-vehicle towing the trailer assembly, in some situations.

With regard to the figures, FIG. 1 depicts a top view of an embodiment of the stability enhancing control system for an assembly (5) of a tow-vehicle (10) towing a trailer (15) that is connected to the tow-vehicle. The tow-vehicle (10) includes an engine (11) with an on-board braking system (12), such as an anti-lock braking system (ABS).

The stability enhancing control system includes a computer (31), that includes an electronic stability enhancing system (20), a processor (25) with a memory (30) located on the tow-vehicle and in communication with the electronic stability enhancing system (20). Computer instructions (35) can be stored in the memory (30) of the processor (25) and adapted for instructing the processor to identify specifications representing the tow-vehicle and specifications representing the trailer to assist with stability and control of the assembly (5). In a preferred embodiment memory (30) can be a 1 gigabyte memory.

In FIG. 1, the tow-vehicle includes four wheels, such as a left front tire and wheel (40), a right front tire and wheel (45), a left rear tire and wheel (50), and a right rear tire and wheel (55). A brake can be adjacent to each wheel, such as a left front brake (60), a right front brake (65), a left rear brake (70), and a right rear brake (75), wherein each brake can connect to the on-board braking system (12). The brakes on the tow-vehicle can be a type of brake, such as an electric brake, a surge brake, a hydraulic brake, a pneumatic brake, an electronic brake, and combinations thereof. Even though FIG. 1 shows four wheels and tires, other embodiments using more tires and wheels are contemplated as useable herein.

The trailer (15) connected to the tow-vehicle (10) can include at least two wheels, such as a left rear tire and wheel (80) and right rear tire and wheel (85) with a brake adjacent to each wheel, such as a left rear brake (90) and a right rear brake (95). The trailer brakes (90) and (95) connect to a surge brake actuator if it is a surge brake, or connect to a plug on the tow-vehicle wired to an on-board brake controller, if it is an electric brake. FIG. 1 depicts the surge version with a surge brake actuator (81) connected to each brake. Computer instructions (35) provide instructions for braking on at least one tire of the tow-vehicle and at least one tire of the trailer using at least one force, at least one motion, and combinations thereof, the electronic stability enhancing system, and the specifications of the tow-vehicle with the connected trailer assembly, such as tow-vehicle weight and trailer weight.

Sensors can be located on the tow-vehicle and the trailer. These sensors can be adapted to communicate with a trailer electrical system and with the processor on the tow-vehicle for identifying the presence of the trailer.

The sensors (100) identify the existence of the trailer when a connection is completed between the electrical circuit of the trailer, which is shown in FIG. 1 as a lighting system, and the electrical circuit of the tow-vehicle. The lighting system of the tow-vehicle (101) is depicted for connection to the electrical system of the trailer in FIG. 1. The lighting system of the trailer includes a left front lighting circuit (105), a right front lighting circuit (110), a left rear lighting circuit (115), and a right rear lighting circuit (120). The lighting system of the tow-vehicle includes a left front lighting circuit (125), a right front lighting circuit (130), a left rear lighting circuit (135), and a right rear lighting circuit (140). The sensors located on the tow-vehicle and the trailer can include a device for detecting a completed electrical circuit, such as a voltmeter to measure voltage or an ohm meter to detect resistance. Other integrated circuit systems, and combinations of voltmeters and ohm meters can be used.

Additional sensors on the tow-vehicle (102 and 66) and the trailer (178) can communicate with the processor (25) on the tow-vehicle to provide information to the processor for stability and control of the tow-vehicle with the connected trailer assembly. The computer (31) can communicate with: a left front tow-vehicle braking pressure sensor (145), a right front tow-vehicle braking pressure sensor (150), a left rear tow-vehicle braking pressure sensor (151), a right rear tow-vehicle braking pressure sensor (152) for providing information on the braking applications. The computer (31) can connect to sensors on the engine (11) and the on-board braking system (12), as well.

The electronic stability enhancing system (20) can communicate with sensors located on the trailer, such as a left rear trailer braking pressure sensor (300) and a right rear trailer braking pressure sensor (305) for providing information on trailer braking applications.

Other examples of sensors can include a left front tow-vehicle wheel speed sensor (155), a right front tow-vehicle wheel speed sensor (160), a left rear tow-vehicle wheel speed sensor (165), and a right rear tow-vehicle wheel speed sensor (170), and a trailer wheel speed sensor (183) for sensing acceleration/deceleration relative to the sensor and providing information on speed of the tow-vehicle and trailer assembly to the computer (31).

A vehicle speed sensor (161) mounted on a differential of the tow-vehicle can provide data to the computer on speed of the tow-vehicle. Another speed sensor (182) mounted on the trailer can provide information to the computer regarding the speed of the connected trailer. Other sensors for providing data to the computer can include a Global Positioning System (GPS) sensor (162) that can be mounted to the tow-vehicle for providing positioning and location information.

Other examples of sensors that can connect to and provide information to the computer (31), include: a steering wheel angle sensor (175), that can provide information on driver inputs, and a steering wheel rate sensor (176), that can provide details on how fast a steering wheel is being turned.

Computer instructions (35), as an electronic response to the input to the processor from the sensors, can be adapted for calculating when and which brakes to apply to alter such tow-vehicle motions as yaw, sway, roll, pitch, and combinations thereof. As an example, a calculation for stabilizing at least one force is used when a tow-vehicle connected to a trailer assembly experiences 28 degrees per second of yaw rate due to the driver's steering actions on a wet road. At this speed, the yaw rate of the trailer exceeds the preset threshold value in the on-board computer (31). The computer (31) calculates that 75 pounds per square inch (psi) of brake line pressure is required at the right front tire and wheel to reduce the yaw rate of the tow-vehicle connected to the trailer assembly.

Figure 2:
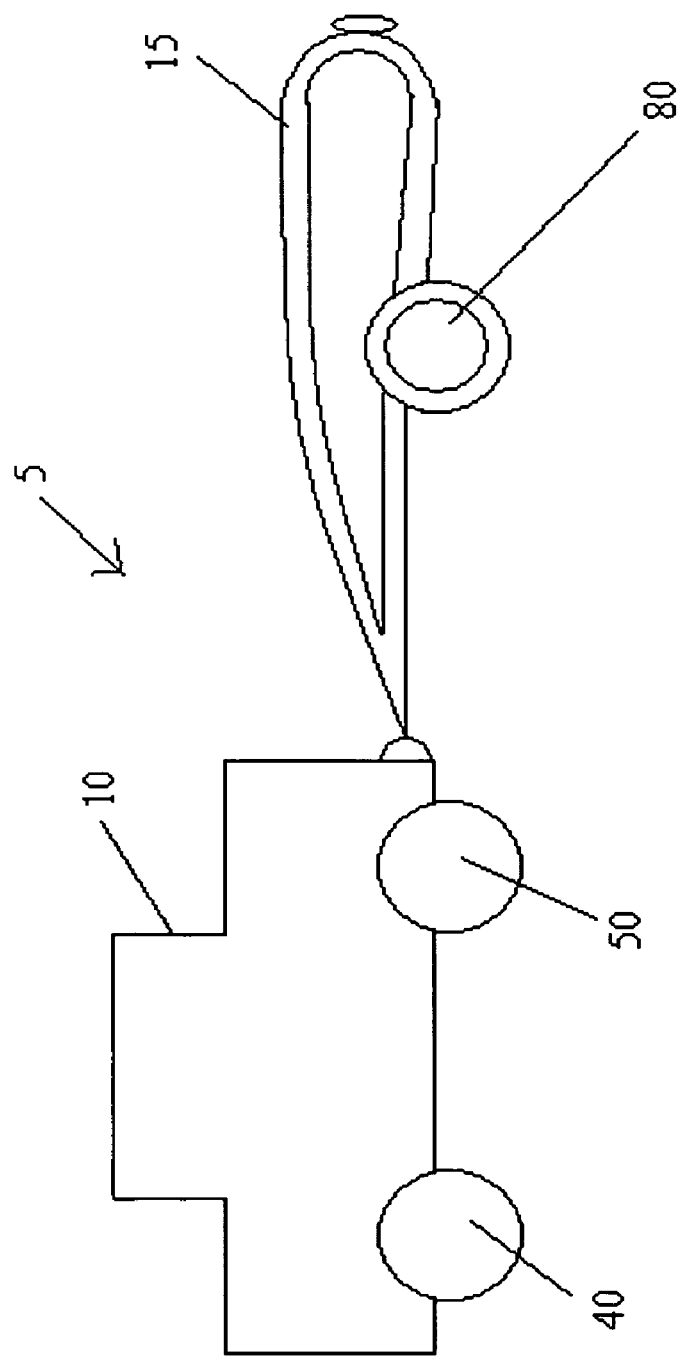
FIG. 2 depicts a side view of an embodiment of the stability enhancing system for a tow-vehicle with a connected trailer assembly comprising at least one wheel.

FIG. 2 depicts a side view of an embodiment of the stability enhancing system for an assembly (5) of a tow-vehicle (10) with a connected trailer (15). Examples of the tow-vehicle (10) can include: a passenger car, a tractor, a sport utility vehicle (SUV), a pick-up truck, a medium truck, a heavy truck, a semi-truck, a van, a recreational vehicle, a bus, or other motorized vehicle comprising at least two wheels, such as a front tire and wheel (40) and a back tire and wheel (50).

Examples of the trailer (15) can include: an equipment trailer, a pop-up trailer, a recreational trailer, a house trailer, a boat trailer, a horse trailer, a utility trailer, a semi-trailer, a tandem trailer, a motorcycle trailer, a car hauler trailer, or other trailer comprising at least one wheel (80).

FIGS. 3-7 depict an example of a tow-vehicle and trailer assembly where the driver loses control in a corner of a road, and how brake force is applied to regain control of the assembly. More specifically, FIG. 3 shows a driver (208) of a Chevrolet Suburban 4×2 (200) towing a trailer (202) containing a Sea Ray Bowrider (204) down FM 1314 (206) near Houston, Tex. The road is depicted in daylight in the rain, so the road is wet.

The Chevrolet Suburban 4×2 (200) includes an electronic stability enhancing control system (201) and sensors (203) in communication with the electronic stability enhancing control system (201). Sensors are located on the trailer and communicate with the electronic stability enhancing control system (201) as well as the sensors (203) on the Chevrolet Suburban (200).

The driver (208) through inattention does not notice that the roadway turns sharply to the left as shown in FIG. 4. Therefore, the driver approaches the corner too fast for roadway conditions and turns left (210) to make the turn.

In FIG. 5, the trailer swings outbound (212) of the turn forcing both the Suburban and trailer to yaw (214). The on-board electronic stability enhancing control system on the tow-vehicle determines that the tow-vehicle has a yaw rate that exceeds the threshold values at the current speed and inputs by the driver. The electronic stability enhancing control system also notes that a trailer is attached, and that the system has read various characteristics pertaining to the trailer.

The electronic stability enhancing control system uses the trailer and tow-vehicle simulation model to determine the appropriate actions to take. Accordingly, the electronic stability enhancing control system decides to apply brakes as shown in FIG. 6 to the right front tire (216) of the Chevrolet Suburban (200). This braking action reduces the sideslip of both the Suburban and the boat trailer.

Then, the driver continues through the corner safely as shown in FIG. 7.

The embodiments of the system permit consideration of at least one force, at least one motion, and combinations thereof, which can act on the vehicle with the connected trailer assembly. Each force, motion, and combination thereof, acting upon the tow-vehicle with the connected trailer assembly can be measured or determined, respectively. Next, the measured or determined force values, motion values, and combinations thereof, can be compared to known threshold values for force and motion to determine if any measured or determined values have exceeded or could exceed the known threshold values. Then, appropriate responses can be calculated for assisting with the stability as well as for determining any mishandling by the driver. This can provide a much improved stability and superior management of the tow-vehicle with the connected trailer assembly than a system that can detect the presence and motion of the vehicle only.

The embodiments of the system can include an assembly with sensors that can provide input to a computer with a processor in communication with an electronic stability enhancing system located on the tow-vehicle. Then, computer instructions can be adapted for calculating at least one force, at least one motion, and combinations thereof, which affect the tow-vehicle with the connected trailer assembly, to provide corrections to handling of the assembly in order to maintain driving stability and control.

Examples of forces and motions include: tow-vehicle speed and trailer speed that can be detected by wheel speed sensors, braking forces on the tow-vehicle and the trailer that can be detected by braking force sensors or braking pressure sensors, and steering angle forces that can be detected by a steering wheel angle sensor on the tow-vehicle.

Examples of tow-vehicle sensors can include: position sensors, force sensors, a wheel speed sensors, torque sensors, a steering wheel angle sensor, steering wheel rate sensors, and combinations thereof.

Examples of trailer sensors can include such sensors as: a proximity braking sensor, a position sensor, a force sensor, a wheel speed sensor, a torque sensor, and combinations thereof. The input from the sensors and the resulting computer instructions can provide optimization regarding specifications and characteristics of the tow-vehicle with the connected trailer assembly to reduce dangerous motions of the assembly, such as sway, pitch, roll, yaw, and combinations thereof, in order to provide a much improved stability enhancing control system.

While these embodiments have been described with emphasis on the embodiments, it should be understood that within the scope of the appended claims, the embodiments might be practiced other than as specifically described herein.

What is claimed is:

1. A stability enhancing control system for a tow-vehicle with a connected trailer assembly, wherein the stability enhancing control system comprises:
   a. an electronic stability enhancing system;
   b. a processor with memory located on the tow-vehicle and in communication with the electronic stability enhancing system;
   c. tow-vehicle sensors located on the tow-vehicle for detecting the engagement with a trailer, wherein the tow-vehicle sensors are adapted to communicate with a trailer electrical system on the trailer and the processor on the tow-vehicle;
   d. trailer sensors located on the trailer for detecting a force, a motion or combinations thereof, and communicating with the trailer electrical system and the processor on the tow-vehicle;
   e. computer instructions adapted for instructing the processor to identify specifications representing the tow-vehicle, wherein the specifications comprise a tow-vehicle length, a tow-vehicle height, a tow-vehicle width, a tow-vehicle weight, a tow-vehicle inertia value, a tow-vehicle wheel configuration, a tow-vehicle wheel size, a tow-vehicle tire characteristic, a tow-vehicle suspension characteristic, and combinations thereof;
   f. computer instructions adapted for instructing the processor to identify specifications representing the trailer, wherein the specifications comprise at least one trailer characteristic;
   g. computer instructions adapted for calculating at least one force, at least one motion, and combinations thereof, affecting the tow-vehicle and the connected trailer assembly, wherein the at least one force, the at least one motion, and combinations thereof, are a member selected from the group consisting of: a lateral force, a lateral motion, a translational motion, an angular motion, a steering input, a steering rate, a vehicle speed, a braking force, a braking pressure, a throttle position, a brake pedal position, a wheel speed, and combinations thereof;
   h. computer instructions for applying braking to at least one wheel of the tow-vehicle using: the at least one force, the at least one motion, and combinations thereof, the electronic stability enhancing system, and the specifications of the tow-vehicle with the connected trailer assembly; and i. computer instructions for applying braking to at least one wheel of the trailer using: the at least one force, the at least one motion, and combinations thereof, the electronic stability enhancing system, the specifications of the tow-vehicle and connected trailer assembly, and the at least one trailer characteristic.

2. The system of claim 1, wherein the tow-vehicle comprises a brake adjacent to each wheel of the tow-vehicle.

3. The system of claim 2, wherein the brake is a member selected from a group of brake types consisting of: an electric brake, a hydraulic brake, a pneumatic brake, and combinations thereof.

4. The system of claim 3, wherein the brake on the tow-vehicle is a different type of brake than a brake on the trailer.

5. The system of claim 1, wherein the trailer comprises a brake adjacent to each wheel of the trailer.

6. The system of claim 5, wherein the brake on the trailer is a member selected from a group of brake types consisting of: an electric brake, a surge brake, a hydraulic brake, a pneumatic brake, and combinations thereof.

7. The system of claim 1, wherein the trailer comprises between one and fifteen axles.

8. The system of claim 1, wherein the tow-vehicle is a member selected from the group consisting of: a passenger car, a tractor, a sport utility vehicle, a pick-up truck, a medium truck, a heavy truck, a semi-truck, a van, a recreational vehicle, a bus, or other motorized vehicle having a brake adjacent to each wheel.

9. The system of claim 1, wherein the trailer is a member selected from the group consisting of: an equipment trailer, a pop-up trailer, semi-trailer, tandem trailer, a recreational trailer, a house trailer, a boat trailer, a horse trailer, a utility trailer, a motorcycle trailer, a race car trailer, an enclosed trailer, a dump trailer, a car hauler trailer, or other trailer having at least two wheels.

10. The system of claim 1, wherein the tow-vehicle sensors located on the tow-vehicle comprise a device for detecting a completed electrical circuit, other integrated circuit system, and combinations thereof 11. The system of claim 10, wherein the tow-vehicle sensors identify the existence of a trailer when a connection is completed between a lighting system of the tow-vehicle and a lighting system of the trailer.

12. The system of claim 1, wherein the trailer sensor located on the trailer is wireless and adapted to communicate with the processor on the tow-vehicle.

13. The system of claim 1, wherein the tow-vehicle sensor on the tow vehicle is a member selected from the group consisting of: a position sensor, a force sensor, a wheel speed sensor, a torque sensor, a steering wheel angle sensor, a steering wheel rate sensor, and combinations thereof.

14. The system of claim 1, wherein the trailer sensor on the trailer is a member selected from the group consisting of: a proximity braking sensor, a position sensor, a force sensor, a wheel speed sensor, a torque sensor, and combinations thereof.

15. The system of claim 1, wherein the trailer characteristic comprises a member selected from the group consisting of: a trailer length, a trailer width, a trailer height, a trailer weight, a trailer wheel configuration, a trailer wheel size, a trailer tire characteristic, a trailer suspension characteristic, a trailer dimensional characteristic, a trailer inertia value, and combinations thereof.

16. The system of claim 1, wherein the computer instructions use the specifications and characteristics of the tow-vehicle and the trailer to reduce sway, pitch, roll, and yaw of the tow-vehicle with the connected trailer assembly when the at least one characteristic exceeds a preset limit.

17. The system of claim 1, wherein the computer instructions adjust engine power to alter the at least one force, the at least one motion, and combinations thereof, of the tow-vehicle with the connected trailer assembly.

* * * * *